United States Patent
Bammi et al.

(10) Patent No.: US 10,168,442 B2
(45) Date of Patent: Jan. 1, 2019

(54) DIFFERENTIAL ENERGY ANALYSIS FOR DIPOLE ACOUSTIC MEASUREMENT

(71) Applicant: Schlumberger Technology Corporation, Sugar Land, TX (US)

(72) Inventors: Sachin Bammi, Katy, TX (US); John Adam Donald, Clamart (FR); Takeshi Endo, Sagamihara (JP)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 171 days.

(21) Appl. No.: 15/156,369

(22) Filed: May 17, 2016

(65) Prior Publication Data
US 2016/0341842 A1    Nov. 24, 2016

(51) Int. Cl.
  *G01V 1/50* (2006.01)
  *G01V 1/48* (2006.01)
  *G01V 1/46* (2006.01)

(52) U.S. Cl.
  CPC .............. *G01V 1/50* (2013.01); *G01V 1/46* (2013.01); *G01V 1/48* (2013.01); *G01V 2200/16* (2013.01); *G01V 2210/646* (2013.01)

(58) Field of Classification Search
  CPC ... G01V 1/40; G01V 1/44; G01V 1/50; G01V 2210/16; G01V 2210/6169; G01V 2210/646
  USPC ............ 367/25, 31, 35; 181/102, 105
  See application file for complete search history.

(56) References Cited

U.S. PATENT DOCUMENTS

| | | | | | |
|---|---|---|---|---|---|
| 4,870,627 | A | * | 9/1989 | Hsu | G01V 1/50 367/25 |
| 4,888,740 | A | * | 12/1989 | Brie | G01V 1/50 181/102 |
| 5,077,697 | A | * | 12/1991 | Chang | G01V 1/005 367/31 |
| 9,341,731 | B2 | * | 5/2016 | Biswas | G01V 1/50 |
| 2005/0034917 | A1 | * | 2/2005 | Mathiszik | G01V 1/44 181/108 |

OTHER PUBLICATIONS

Brie, A., Hsu, K. and Eckersley, C., "Using the Stoneley Normalized Differential Energies for Fracture Reservoir Evaluation", Proceedings of 29th SPWLA Symposium, 1988, 25 pages.

(Continued)

*Primary Examiner* — Ian J Lobo
(74) *Attorney, Agent, or Firm* — Eileen Pape

(57) ABSTRACT

Systems and methods for differential energy analysis of dipole acoustic signals to facilitate identification of geological or borehole characteristics are provided. An acoustic downhole tool may be placed into a borehole in a geological formation. A dipole acoustic signal may be emitted using one or more acoustic transmitters of the downhole tool, and the dipole acoustic signal may be measured using one or more acoustic receivers of the downhole tool. Using a processor, a dipole differential energy of the dipole acoustic signal (as measured by two of the one or more acoustic receivers or as emitted by two of the one or more acoustic transmitters, or both) may be computed. The processor may provide an indication of the dipole differential energy to facilitate identification of characteristics of the geological formation or the borehole, or both.

19 Claims, 6 Drawing Sheets

(56) References Cited

OTHER PUBLICATIONS

Donald A. and Bratton, T., "Advancements in Acoustic Technique for Evaluating Open Natural Fractures", presented at the SPWLA 47th Annual Logging Symposium, Veracruz, Mexico, Jun. 4-7, 2006, 10 pages.

Farag, S., C. Mas, P.D. Maizeret, B. Li and Le Van Hung, "An integrated Workflow for Granitic-Basement-Reservoir Evaluation", SPE 123455, SPE Reservoir Evaluation & Engineering, Dec. 2010, pp. 893-905.

Hornby, B.E., Johnson, D.L., Winkler, K.H. and Plumb, R.A., "Fracture evaluation using reflected Stoneley-wave arrivals", Geophysics, vol. 54, No. 10, Oct. 1989, pp. 1274-1288.

Plona, T.J., Sinha, B.K., Kane, M.R., Viloria, O., "Using Acoustic Anisotropy", presented at 41th SPWLA Symposium, Jun. 4-7, 2000, 12 pages.

Plona, T, Sinha, B., Kane, M. R., Shenoy, R., Bose, S., Walsh, J., Endo, T., Ikegami, T., and Skelton, O., "Mechanical damage detection and anisotropy evaluation using dipole sonic dispersion analysis", Proceedings of 43th SPWLA Symposium, Jun. 2-5, 2002, 14 pages.

Plona, T., Kane, M., Alford, J., Endo, T., Walsh, J. and Murray, D., "Slowness-Frequency Projection Logs: A New QC Method for Accurate Sonic Slowness Evaluation", Proceedings of 46th SPWLA Symposium, Jun. 26-29, 2005, 7 pages.

Endo, T., Tezuka, K., Fukushima, T., Brie, A., Mikado, H., and Miyairi, M., 1998, Fracture Evaluation from Inversion of Stoneley Transmission and Reflections, Proceedings of SEGJ International Symposium. (8 pages).

\* cited by examiner

DIFFERENTIAL ENERGY ANALYSIS FOR DIPOLE ACOUSTIC MEASUREMENT

This application claims priority to EP15290130.2 under 35 USC 119(a), entitled "A System And Method For Quantitatively Estimating A Robust Fracture Indicator Using Dipole Acoustic Waveforms As A Complement To Stoneley Waveform Analysis" filed May 18, 2015, the entire disclosure of which is hereby incorporated herein by reference.

BACKGROUND

This disclosure relates to acoustic downhole measurements and, more particularly, a differential energy analysis of dipole acoustic signals to facilitate identification of geological or borehole characteristics.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

Acoustic measurements may be used to evaluate a borehole in a geological formation. Generally speaking, acoustic downhole tools may use monopole or dipole acoustic transmitters to obtain acoustic measurements. A monopole transmitter emits energy equally in omni-direction away from its center, while a dipole transmitter emits energy in a particular direction. To identify fractures in a borehole, monopole transmitters may be used in what is referred to as a low frequency Stoneley waveform analysis. Specifically, a Stoneley wave propagates along the interface between the borehole fluid and the formation. Thus, the monopole low frequency acoustic signal may attenuate depending on characteristics of the geological formation along the borehole, such as a fracture or permeable zone. Accordingly, monopole Stoneley waveform analysis may be a useful tool to identify fracture or permeable zones in a borehole.

The monopole Stoneley waveform analysis, however, may also be affected by other borehole characteristics other than the presence of fractured zone. Borehole enlargements and/or bed boundaries, from the perspective of a Stoneley waveform analysis, could have similar signatures to a highly fractured zone. As such, it may be difficult to differentiate a highly fractured zone from a problematic rugose borehole using a Stoneley analysis alone. To differentiate these different situations, a borehole image may be obtained and compared to the Stoneley waveform analysis. However, there may be situations in which a borehole image is not available.

SUMMARY OF DISCLOSED EMBODIMENTS

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

This disclosure relates to a differential energy analysis of dipole acoustic signals to facilitate identification of geological or borehole characteristics. For example, a disclosed method includes placing an acoustic downhole tool into a borehole in a geological formation, emitting a dipole acoustic signal using one or more acoustic transmitters of the downhole tool, and measuring the dipole acoustic signal using one or more acoustic receivers of the downhole tool. Using a processor, a dipole differential energy of the dipole acoustic signal (as measured by two of the one or more acoustic receivers or as emitted by two of the one or more acoustic transmitters, or both) may be computed. The processor may provide an indication of the dipole differential energy to facilitate identification of characteristics of the geological formation or the borehole, or both.

In another example, a downhole well logging system includes one or more acoustic transmitters that emit a dipole acoustic signal in a borehole drilled into a geological formation, one or more acoustic receivers that measure the dipole acoustic signal, and a processor. The processor may determine a dipole differential energy of the dipole acoustic signal as measured by two of the one or more acoustic receivers or as emitted by two of the one or more acoustic transmitters, or both. The processor may also provide an indication of the dipole differential energy to facilitate identification of characteristics of the geological formation or the borehole, or both.

In another example, one or more tangible, non-transitory, machine-readable media may include instructions to receive dipole energy curves over depth for each receiver and each transmitter obtained by an acoustic downhole tool placed in a borehole in a geological formation and compute normalized differential energy curves for multiple receiver pairs or transmitter pairs, or both, using at least some of the dipole energy curves. The instructions may also include instructions to obtain a stacked receiver normalized differential energy curve by combining some of the normalized differential energy curves for at least some of the plurality of receiver pairs, or obtain a stacked transmitter normalized differential energy curve by combining some of the normalized differential energy curves for at least some of the plurality of transmitter pairs, or obtain both the stacked receiver normalized differential energy curve and the stacked transmitter normalized differential energy curve. The stacked receiver normalized differential energy curve or the stacked transmitter normalized differential energy curve, or both, may facilitate identification of characteristics of the geological formation or the borehole, or both.

Various refinements of the features noted above may be obtained in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended just to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are just examples of the presently disclosed techniques. Additionally, in an effort to provide a concise description of these embodiments, some features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would still be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As a complement or alternative to a monopole Stoneley waveform analysis, a dipole waveform analysis may also be used to obtain an indication of geological characteristics of the formation (e.g., the presence of a fracture or permeable zone). In particular, while a monopole Stoneley waveform analysis may sometimes have difficulty differentiating effects from bad borehole conditions (e.g., borehole enlargements), bed boundaries, or features of interest (e.g., fractures or permeable zone), a dipole acoustic wave analysis can provide azimuthal information that may facilitate identification of fractures, even when a borehole image is not available. The dipole acoustic wave analysis of this disclosure may use any suitable dipole acoustic measurements from any suitable downhole acoustic tool.

Figure 1:
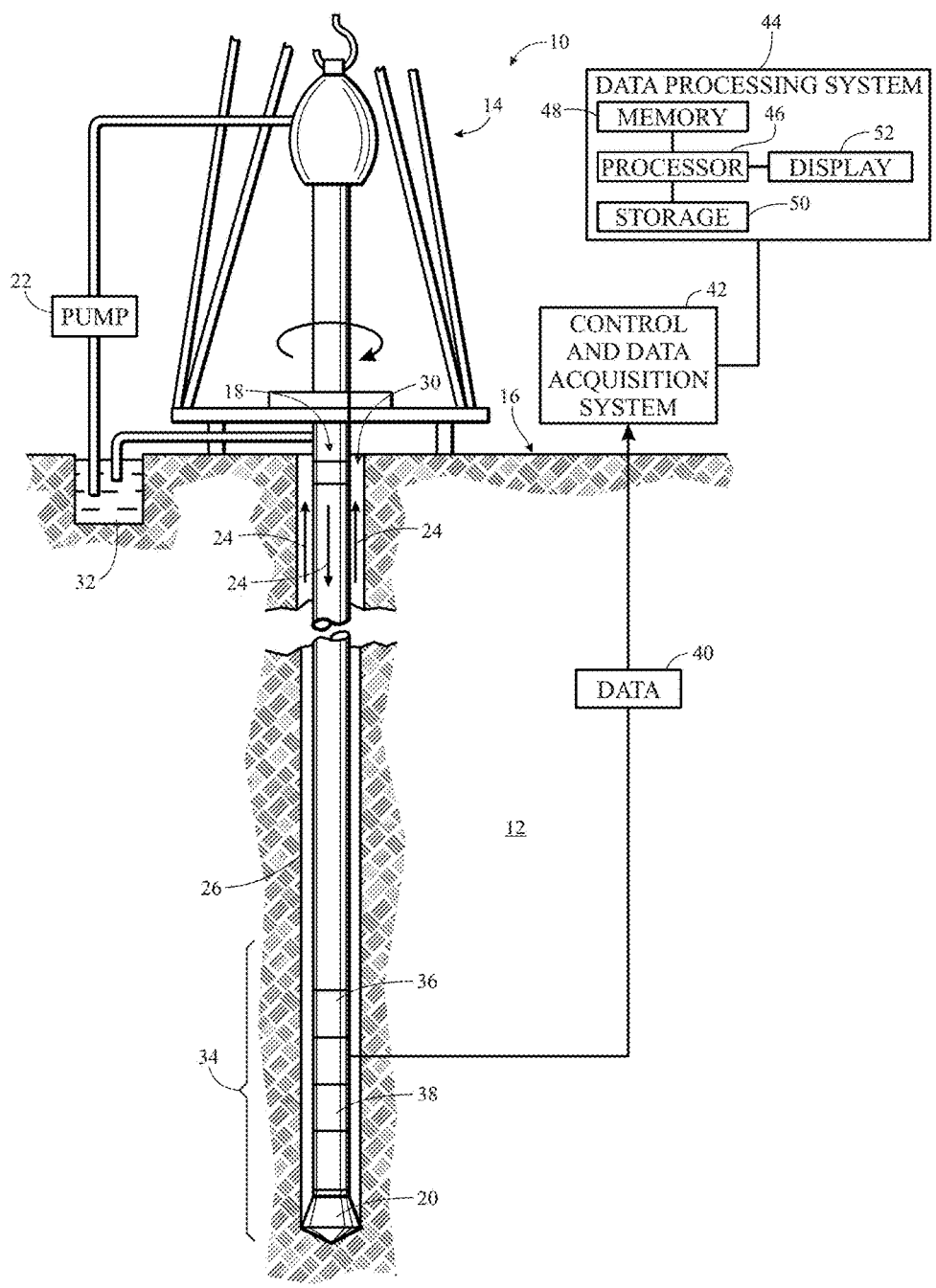
FIG. 1 is a schematic view of a downhole acoustic system for dipole differential energy analysis, in accordance with an embodiment.

FIG. 1 represents an example of an acoustic logging system 10 that may be used to obtain dipole acoustic measurements for use with the dipole differential energy analysis of this disclosure. Although FIG. 1 is shown by example in a wireline configuration, it should be appreciated that any suitable means of conveyance may be used. For example, other suitable means of conveyance may include logging-while-drilling (LWD), coiled tubing, or through-the-bit conveyances.

With this in mind, the system 10 may obtain acoustic logging measurements useful to identify characteristics of the well in a geological formation 12. In the system 10, a wireline conveyance system 14 at the surface 16 may place into a wellbore 18 a downhole tool 20. The downhole tool 20 may measure the physical properties of the geological formation 12, such as density, porosity, resistivity, lithology, permeability, presence or absence of a fracture, and so forth. The downhole tool 20 may include an acoustic logging tool that may obtain dipole acoustic measurements that may be used in the dipole differential analysis of this disclosure.

The downhole tool 20 may collect a variety of data 40 that may be stored and processed downhole or, as illustrated in FIG. 1, may be sent to the surface for processing. In the example of this disclosure, the downhole tool 20 may include an acoustic logging tool that may obtain dipole acoustic measurements. The data 40 that is collected may include energy curves of dipole acoustic measurements that may contain information relating to characteristics of the geological formation 12 and/or the wellbore 18. The data 40 may be sent via a control and data acquisition system 42 to a data processing system 44. The control and data acquisition system 42 may receive the data 40 in any suitable way. In one example, the control and data acquisition system 42 may transfer the data 40 via electrical signals pulsed through the geological formation 12 or via mud pulse telemetry using the drilling fluid 24. In another example, the data 40 may be retrieved directly from the downhole tool 20 upon return to the surface 16.

The data processing system 44 may include a processor 46, memory 48, storage 50, and/or a display 52. The data processing system 44 may use the data 40 to determine various properties of the well using any suitable techniques. As will be discussed further below, the data processing system 44 may use dipole acoustic measurements to facilitate identification of characteristics (e.g., the presence or absence of fractures) in the wellbore 18 and/or the geological formation 12. To process the data 40, the processor 46 may execute instructions stored in the memory 48 and/or storage 50. As such, the memory 48 and/or the storage 50 of the data processing system 44 may be any suitable article of manufacture that can store the instructions. The memory 46 and/or the storage 50 may be ROM memory, random-access memory (RAM), flash memory, an optical storage medium, or a hard disk drive, to name a few examples. The display 52 may be any suitable electronic display that can display the logs and/or other information relating to properties of the well as measured by the downhole tool 20. It should be appreciated that, although the data processing system 44 is shown by way of example as being located at the surface, at least part of the data processing system 44 may be located in the downhole tool 20. In such embodiments, some of the data 40 may be processed and stored downhole, while some of the data 40 may be sent to the surface in real time. This may be the case particularly in LWD, where a limited amount of the data 40 may be transmitted to the surface during drilling or reaming operations.

Figure 2:
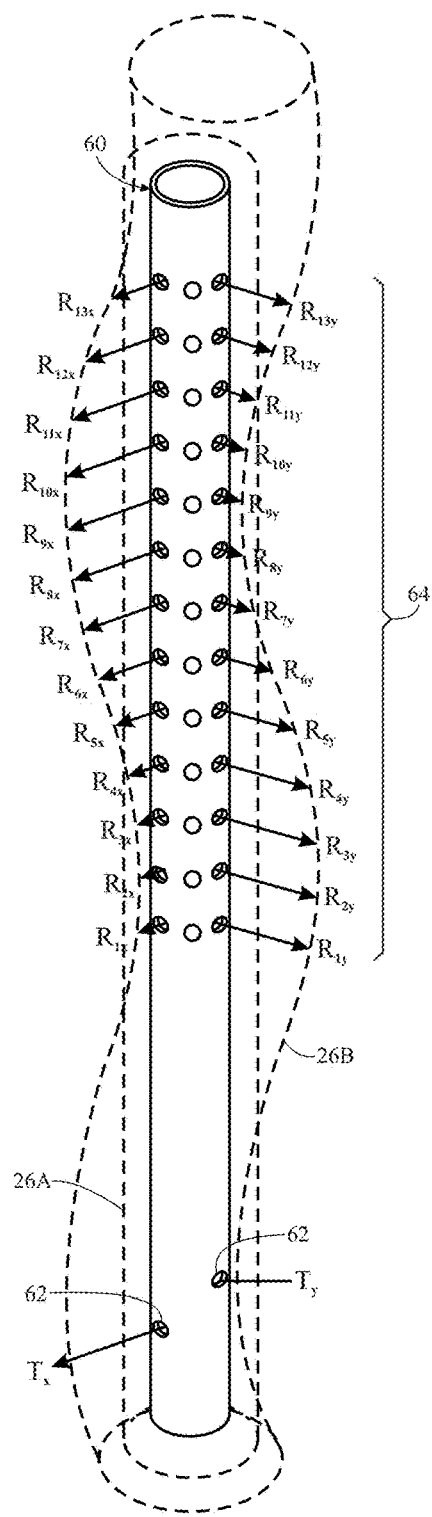
FIG. 2 is a schematic view of an acoustic downhole tool that may be used with the dipole differential energy analysis of this disclosure, in accordance with an embodiment.

As noted above, any suitable downhole tool that can obtain a differential dipole acoustic measurement may be used. FIG. 2 illustrates one non-limiting example of an acoustic downhole tool 60 that may obtain such a measurement. The acoustic downhole tool 60 of FIG. 2 includes dipole transmitters 62 and array of dipole receivers 64. In the example of FIG. 2, the dipole transmitters 62 are azimuthally offset from one another by 90 degrees and so are referred as Tx and Ty. It should be appreciated that more acoustic transmitters 62 may be located on other suitable acoustic downhole tools. Indeed, other acoustic downhole tools may include an array of acoustic transmitters 62. In such a configuration, at least one pair of transmitters 62 may be oriented in the same azimuthal direction (e.g., the x-direction in an (x, y, z) coordinate system) and vertically offset from one another (e.g., offset by some spacing in the z-direction in the (x, y, z) coordinate system). Such a pair of acoustic transmitters 62 may be used to generate dipole acoustic signals that can be used to determine a differential energy even when measured by just one receiver 64.

In the acoustic downhole tool 60 shown in FIG. 2, the array of receivers 64 includes x-direction dipole receivers and y-direction dipole receivers 64 that are offset from one another by 90 degrees, respectively labeled R1x, R1y, R2x, R2y, R3x, R3y, R4x, R4y, R5x, R5y, R6x, R6y, R7x, R7y, R8x, R8y, R9x, R9y, R10x, R10y, R11x, R11y, R12x, R12y, R13x, and R13y. The x-direction dipole receivers 64 may be oriented in the same azimuthal direction (e.g., the x-direction in an (x, y, z) coordinate system) and vertically offset from one another (e.g., offset by some spacing in the z-direction in the (x, y, z) coordinate system). The y-direction dipole receivers 64 may be oriented in the same azimuthal direction (e.g., the y-direction in an (x, y, z) coordinate system) and vertically offset from one another (e.g., offset by some spacing in the z-direction in the (x, y, z) coordinate system).

When one or both of the dipole transmitters 62 emits a dipole acoustic signal, it may impact the wellbore 18 in an undisturbed state (illustrated by numeral 26A), causing the wellbore 18 to react by moving (illustrated in exaggerated form by numeral 26B). This causes the dipole signal to propagate along the wellbore 18 where it can be detected by the array of receivers 64.

Figure 3:
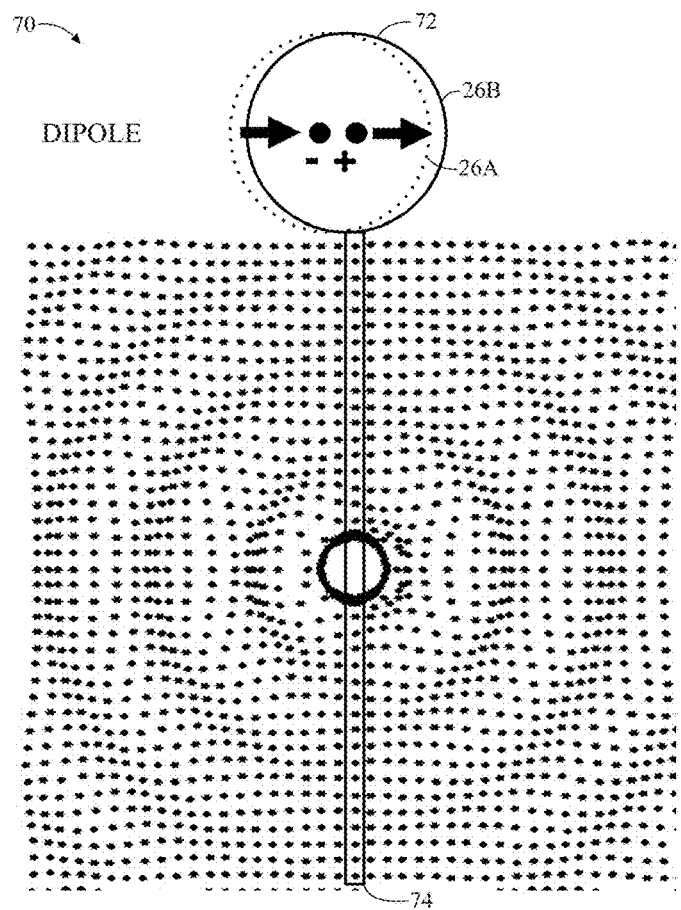
FIG. 3 is a visualization of a dipole acoustic wave inside a borehole, in accordance with an embodiment.

A dipole acoustic signal may provide different information about the wellbore 18 and/or geological formation 12 than a monopole acoustic signal because a dipole acoustic signal does not emanate equally from the acoustic source transmitter like a monopole acoustic signal. Instead, as shown by an example waveform diagram 70 of FIG. 3, a dipole acoustic signal 72 is positive in one direction and negative in another, thereby producing no motion in a direction perpendicular to the dipole firing direction (as illustrated by numeral 74). In turn, the dipole acoustic signal 72 travels azimuthally unequally along the wellbore 18 and thus can provide azimuthal information when the dipole acoustic signal 72 is detected by acoustic receivers 64. In addition, as the dipole acoustic signal 72 propagates along the wellbore 18, the dipole acoustic signal 72 extends deeper into the geological formation 12 (e.g., extending about 3 feet or so into the geological formation 12) than would a monopole Stoneley waveform. As such, the dipole acoustic waveform 72 may also indicate additional information about the geological formation 12 near to the wellbore 18.

As the dipole acoustic waveform 72 propagates along the wellbore 18, the attenuation of the dipole acoustic waveform 72 may indicate characteristics (e.g., the presence or absence of a fracture or an extent of permeable zone of the wellbore 18 and/or the geological formation 12. Moreover, the attenuation of the dipole acoustic waveform 72 may indicate an azimuthality of fractures or permeable zone while also providing information about the geological formation 12 further away from the borehole 12.

Figure 4:
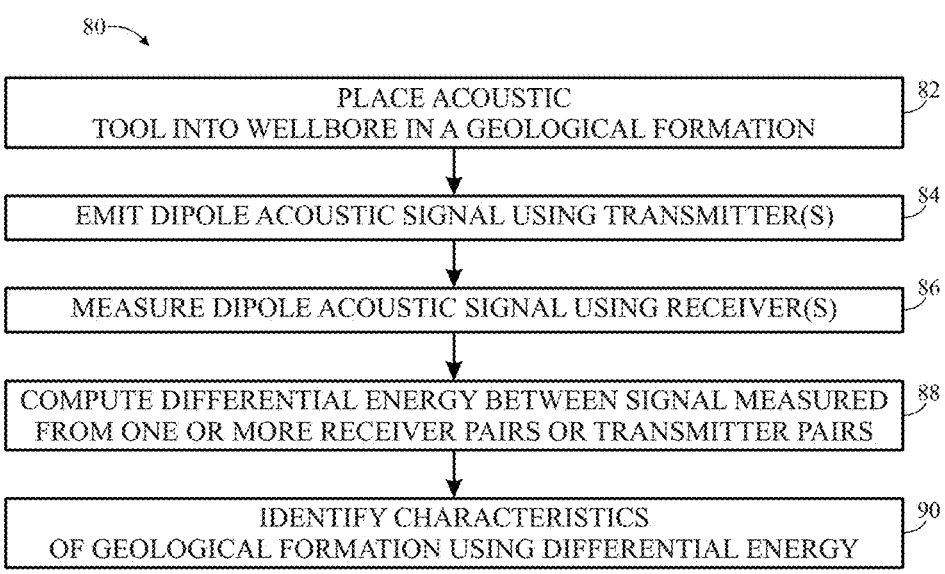
FIG. 4 is a flowchart of a method for using dipole acoustic measurements to identify characteristics of a geological formation by determining a dipole differential energy, in accordance with an embodiment.

The attenuation of the dipole acoustic waveform 72 may be used in a dipole differential energy analysis, as shown by a flowchart 80 of FIG. 4. The flowchart 80 of FIG. 4 may begin when any suitable downhole acoustic tool (e.g., the downhole acoustic tool 60) is placed into a wellbore 18 in geological formation 12 (block 82). As noted above, this placement may occur using any suitable conveyance, such as logging-while-drilling (LWD), wireline, coiled tubing, or through-the-bit conveyance.

A dipole acoustic signal may be emitted by one or more acoustic transmitters (block 84) and detected by one or more acoustic receivers (block 86). A differential energy may be computed between one or more receiver pairs or one or more transmitter pairs (block 88). Before continuing, it should be noted that blocks 84, 86, and 88 may be carried out in a variety ways, provided that the attenuation of dipole acoustic signals over some depth interval can be measured. As such, in one example, block 84 may involve emitting a dipole acoustic signal using one acoustic transmitter and block 86 may involve measuring the dipole acoustic signal using at least one pair of acoustic receivers (e.g., two acoustic receivers in the same azimuthal direction that are vertically offset from one another by some spacing). In another example, block 84 may involve emitting a dipole acoustic signal using a pair of acoustic transmitters (e.g., two acoustic receivers in the same azimuthal direction that are vertically offset from one another by some spacing) and block 86 may involve measuring the dipole acoustic signal using at least one acoustic receivers. Either of these cases may allow the measurement of the attenuation of the dipole acoustic signal over some depth interval. The dipole differential energy may be computed in block 88 between any number of pairs of acoustic receivers or acoustic transmitters. The dipole differential energy may be presented to facilitate identification of characteristics of the geological formation 12 and/or the wellbore 18, such as the depth and/or azimuthal location of a fracture or permeable zone (block 90).

Figure 5:
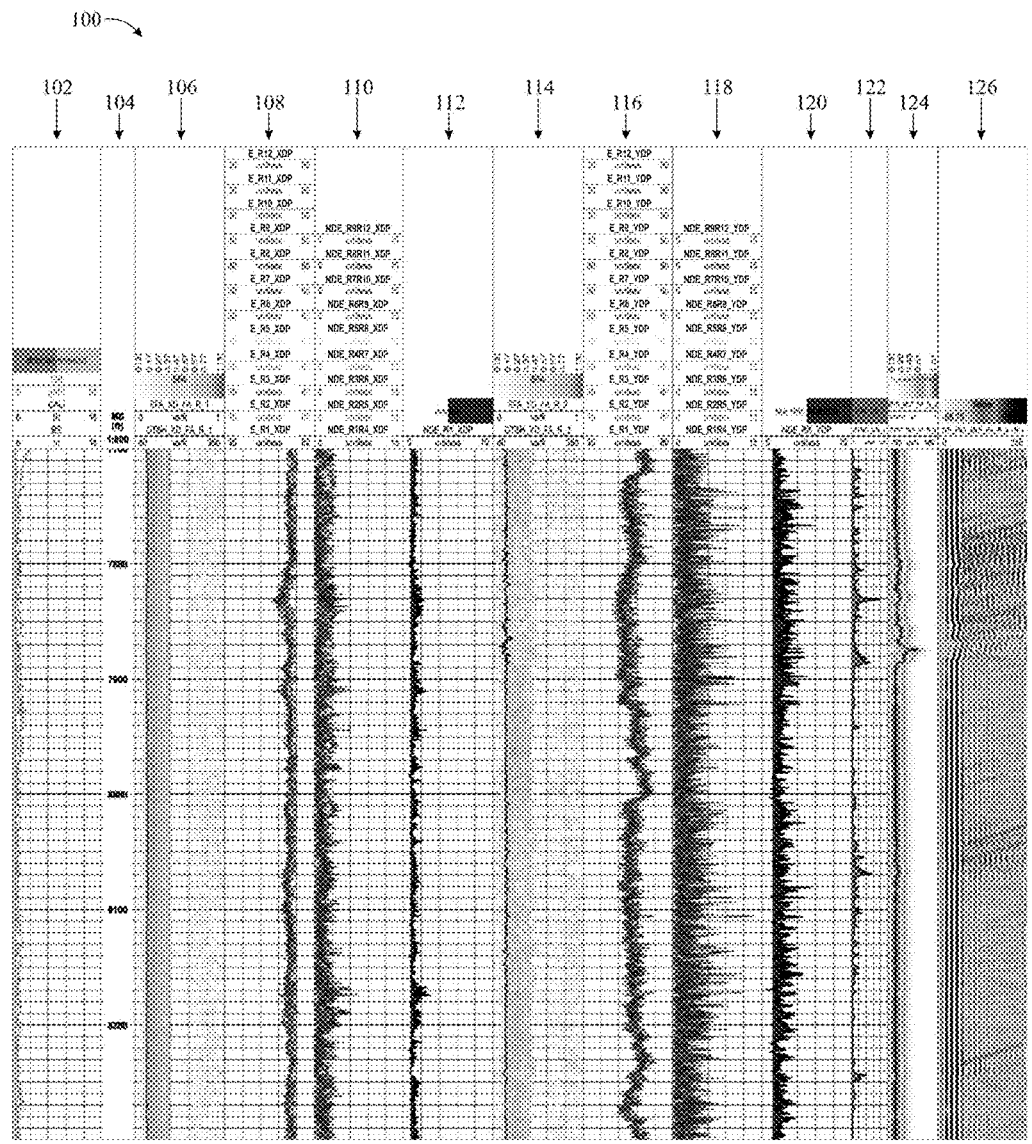
FIG. 5 is an example well log that includes tracks of dipole normalized differential energy that may be used to indicate the presence of fractures or other geological characteristics, in accordance with an embodiment.

By way of example, FIG. 5 illustrates a well log 100 that may include tracks related to dipole differential energy. The well log 100 includes tracks 102, 104, 106, 108, 110, 112, 114, 116, 118, 120, 122, 124, and 126. Of these, tracks 108, 110, 112, 116, 118, and 120 relate to the dipole differential analysis of this disclosure and may complement the other tracks 102, 104, 106, 114, 122, 124, and 126. The other tracks may include a washout/mudcake indicator (track 102), depth (track 104), slowness frequency analysis of x-dipole (track 106), slowness frequency analysis of y-dipole (track 114), monopole Stoneley reflection coefficient (track 122), monopole Stoneley slowness (track 124), and monopole Stoneley variable density log (VDL) (track 126).

Of the tracks related to dipole differential analysis, tracks 108, 110, and 112 relate to acoustic dipole measurements from x-direction-oriented acoustic receivers and tracks 116, 118, and 120 relate to acoustic dipole measurements from y-direction-oriented acoustic receivers. In particular, track 108 shows a number of acoustic energy curves from various x-direction-oriented acoustic receivers juxtaposed on the same track. Track 110 shows x-dipole normalized differential energy (NDE) curves of pairs of x-direction-oriented acoustic receivers, which may be determined based on the acoustic energy curves of track 108. Various manners of determining the x-dipole NDE curves of track 110 will be discussed further below. Track 112 represents an x-dipole arithmetic average of the x-dipole NDE curves of track 110. The x-dipole arithmetic average NDE curve of track 112 may operate as an indicator for fractures. In some embodiments, a baseline energy level may be removed from the x-dipole arithmetic average NDE curve to further emphasize outlying differential energy values that may be particularly indicative of fractures.

The y-dipole tracks 116, 118, and 120 provide different azimuthal measurements than the x-dipole tracks 108, 110, and 112. As such, differences between these measurements can indicate different azimuthal conditions in the wellbore 18. Track 116 shows a number of acoustic energy curves from various y-direction-oriented acoustic receivers juxtaposed on the same track. Track 118 shows y-dipole normalized differential energy (NDE) curves of pairs of y-direction-oriented acoustic receivers, which may be determined based on the acoustic energy curves of track 116. Various manners of determining the y-dipole NDE curves of track 116 will be discussed further below. Track 120 represents a y-dipole arithmetic average of the y-dipole NDE curves of track 118. The y-dipole arithmetic average NDE curve of track 120 may operate as an indicator for fractures. In some embodiments, a baseline energy level may be removed from the y-dipole arithmetic average NDE curve to further emphasize outlying differential energy values that may be particularly indicative of fractures. Additionally or alternatively, the x-dipole arithmetic average curve of track 112 and the y-dipole arithmetic average curve of track 120 may be combined (e.g., in an arithmetic average) to produce a combined x-and-y fracture indicator. The combined x-and-y fracture indicator resulting from this combination may be used to indicate a permeable zone that is found in both the x- and y-directions, which may provide further indication of a fracture.

Figure 6:
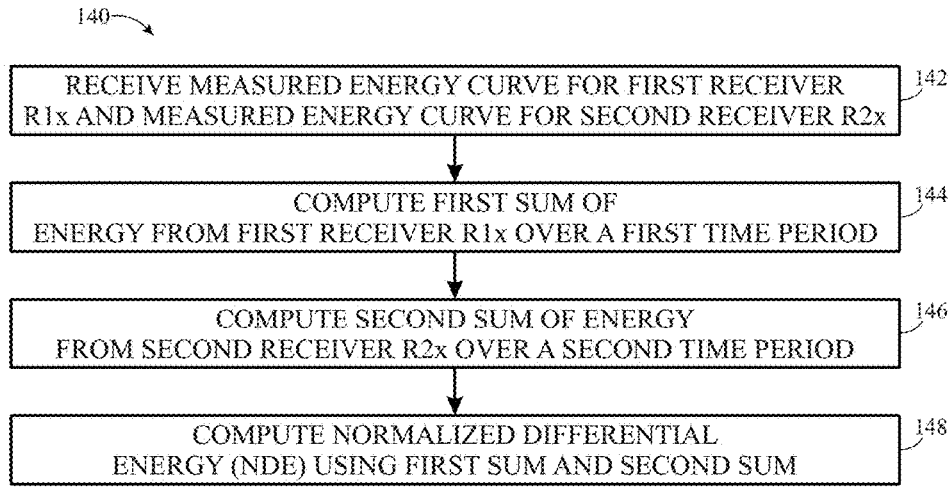
FIG. 6 is a flowchart of a method for computing a normalized differential energy (NDE) of an acoustic dipole measurement detected by a pair of receivers, in accordance with an embodiment.

As noted above, computing a dipole normalized differential energy (NDE) relates to determining an amount of dipole attenuation between a pair of vertically aligned acoustic receivers or a pair of vertically aligned acoustic transmitters. A flowchart 140 of FIG. 6 illustrates a method for computing dipole NDE from such a pair of acoustic receivers (e.g., thereby producing a differential energy curve as illustrated in track 110 or track 118 of FIG. 5). The dipole NDE may be computed, for example, in the data processing system 44 described with reference to FIG. 1. To compute the dipole NDE, a measured dipole acoustic energy curve for a first acoustic receiver (e.g., R1x) and a measured dipole acoustic energy curve for a second acoustic receiver (e.g., R2x), as obtained by an acoustic downhole tool (e.g., the acoustic downhole tool 60) and discretized may be received into the data processing system 44 (block 142). A sum of energy from the first acoustic receiver (e.g., R1x) may be computed over some first time-window (block 144). The following pseudocode illustrates an example computation:

```
for i in range(T1,T2):
    wsumR1x=wsumR1x+pow(a[i],2),
``` where wsumR1x represents the sum of energy of the first acoustic receiver, T1 represents a starting point of the first time window and T2 represents an ending point of the first time window, and a[i] represents the discrete measurement values at discrete points of time i in the first acoustic receiver energy curve. The sum of energy of the first acoustic receiver (e.g., R1x) may be converted to decibel form (represented below as er1x), as represented by the following pseudocode:

$$er1x = 10 * \log(wsumR1x, 10)$$

A similar sum of energy from the second acoustic receiver (e.g., R2x) may be computed over some second time window (block 146). The second time window may have the same duration as the first time window, but may be offset from the first time window by amount of time for wave propagation between the first and the second receiver. An example computation of the sum of energy from the second receiver (e.g., R2x) is shown below:

```
for j in range((T1+Toffset),(T2+Toffset)):
    wsumR2x=wsumR2x+pow(a[j],2)
``` where wsumR2x represents the sum of energy of the first acoustic receiver, T1+Toffset represents a starting point of the second window and T2+Toffset represents an ending point of the first window, a[j] represents discrete measurement values at discrete points of time j in the second acoustic receiver energy curve, and Toffset represents an offset in time of the second window from the first window. The offset Toffset in time may be fixed for a given pair of acoustic receivers or may vary. The offset in time Toffset may be adjusted by an operator depending on wave characteristics in the geological formation (e.g., a known lithology or other well logging information). The sum of energy of the second acoustic receiver (e.g., R2x) may be converted to decibel form (represented below as er2x), as represented by the following pseudocode:

$$er2x = 10 * \log(wsumR2x, 10)$$

The dipole normalized differential energy (NDE) may be computed using the measurements of the first sum and the second sum (block 148). For example, an absolute difference between the first sum and the second sum may be divided by a spacing distance between the first receiver (e.g., R1x) and the second receiver (e.g., R2x). The following pseudocode describes an example for calculating the NDE (shown below as nde_R1R2_xdp) when the spacing distance between the first acoustic receiver (e.g., R1x) and the second receiver (e.g., R2x) is 1 foot:

$$nde\_R1R2\_xdp = abs(((er1x - er2x)/1))$$

Carrying out blocks 142, 144, 146, and 148 over a variety of time windows of the measured receiver energy curves may produce a dipole normalized differential energy (NDE) curve over many depths of the wellbore 18 (e.g., as represented by the NDE energy curves shown in track 110 of FIG. 5). Moreover, it should be appreciated that the dipole NDE may also be determined from pairs of transmitters in a similar manner. Indeed, using "transmitter section or array processing," the differential energy measurements can be made between pairs of shots rather than between pairs of receivers, as in the receiver section processing described in this section. The stacking of differential energy measurements obtained by transmitter section processing with those obtained by receiver section processing may offer further improvements in the stacked (e.g., combined or averaged) dipole NDE log track, since measurement variations caused by effects such as bed boundaries and borehole enlargements anti-correlate between the two and tend to cancel out, thereby improving the fracture indication.

Figure 7:
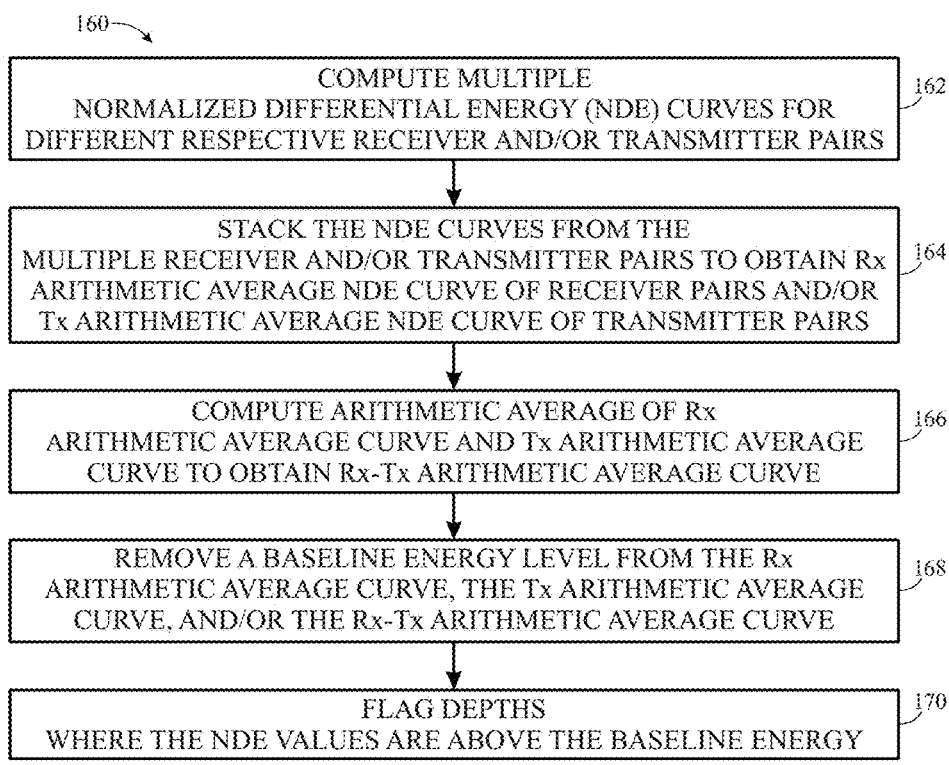
FIG. 7 is a flowchart of a method for generating a dipole normalized differential energy (NDE) indicator, in accordance with an embodiment.

Indeed, as shown by a flowchart 160 of FIG. 7, receiver-based dipole normalized differential energy (NDE) curves and/or transmitter-based dipole NDE curves may be used to form a fracture indicator. To do so, multiple dipole NDE curves may be computed for various pairs of acoustic receivers and/or acoustic transmitters (block 162). The dipole NDE curves of block 162 may be computed, for example, in the manner described above. The receiver-based dipole NDE curves may be stacked (e.g., combined and/or averaged) to obtain a receiver arithmetic average dipole NDE curve (block 164). Additionally or alternatively, the transmitter-based dipole NDE curves may be stacked (e.g., combined and/or averaged) to obtain a transmitter arithmetic average dipole NDE curve. In some embodiments, these two arithmetic average curves may themselves be stacked (e.g., combined or averaged) to obtain a receiver-transmitter dipole NDE curve (block 166).

Using any of the dipole NDE curves discussed above (e.g., the receiver arithmetic average dipole NDE curve, the transmitter arithmetic average dipole NDE curve, the receiver-transmitter dipole NDE curve, or even the dipole NDE curves from specific pairs of acoustic receivers or transmitters), a fracture indicator may be determined by removing a baseline energy level (block 168). For example, a moving average (e.g., over a sliding window) of the receiver-transmitter dipole NDE curve may be subtracted from that curve. This may be particularly effective when the log interval is very long with several lithological variations. Additionally or alternatively, a quiet zone where the NDE curve is fluctuating less than some fluctuation threshold value may serve as the baseline energy level. The NDE level from that interval may be subtracted from the NDE curve. The resulting curve may represent a fracture indicator that may be suggestive of a fracture.

To further accentuate depths that are likely to indicate a fracture, depths where the resulting dipole normalized differential energy (NDE) curve exceeds some threshold (e.g., are above the baseline energy level or some value above or some value below the baseline energy level) may be flagged as being more likely than other depths to be a fracture location (block 170).

Figure 8:
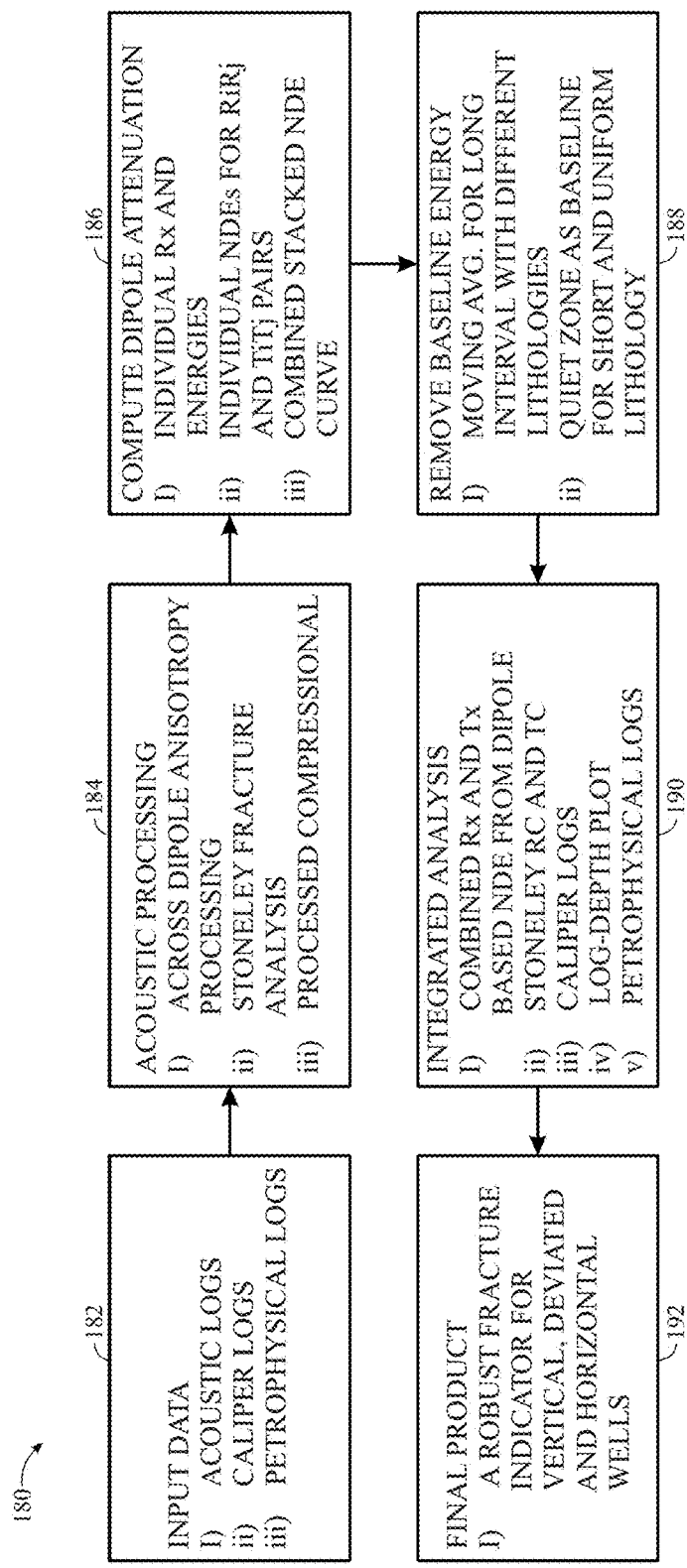
FIG. 8 is a flowchart of a workflow that may incorporate the dipole normalized differential energy (NDE) to evaluate a wellbore in a geological formation, in accordance with an embodiment.

The dipole normalized differential energy (NDE) analysis of this disclosure may be used as part of a larger acoustic well logging workflow, as shown in a workflow 180 of FIG. 8. Indeed, acoustic data may be obtained and stored as formation evaluation logs from vertical, deviated, or horizontal wells, along with other complementary logging data (block 182). For example, the acoustic data may include full waveform acoustics logs (cross-dipole shear, compressional and low frequency Stoneley), and other complementary logging data may include caliper logs and petrophysical logs (e.g., density, lithology). Initial acoustic processing may be performed (block 184). The initial acoustic processing may include cross-dipole anisotropy analysis to get oriented dipole shear waveforms, low frequency Stoneley fracture analysis to generate Stoneley Reflection and Transmission coefficients, and/or compressional wave velocity.

The dipole normalized differential energy (NDE) analysis discussed above may be performed (blocks 186 and 188). For example, stacked or arithmetic average dipole NDE curves may be generated by computing (fast and slow) dipole attenuation for the log interval at block 186. As noted above, this may involve obtaining individual energy curves for each receiver and transmitter, computing individual NDE curves for various receiver pairs and transmitter pairs, combining various NDE curves from the receiver pairs and transmitter pairs to obtain their respective arithmetic average curves, and computing a combined receiver-transmitter NDE curve by taking an arithmetic average of the respective average receiver and transmitter curves.

At block 188, a baseline energy level may be removed from any of the dipole NDE curves (e.g., the receiver-transmitter dipole NDE curve). For instance, if the log interval is relatively long (e.g., beyond a threshold length) and contains many lithological variations in relation to changes in depth, a moving average (e.g., from a sliding window) may be removed from the receiver-transmitter dipole NDE curve. Additionally or alternatively, for a lithologically similar interval, a quiet zone where the receiver-transmitter dipole NDE curve is not fluctuating beyond a fluctuation threshold may provide a baseline NDE that may be removed from the receiver-transmitter dipole NDE curve. Further, the depths where the NDE values are above the baseline or some other energy threshold may be flagged as being more likely than otherwise to contain a fracture.

These various acoustic curves may be used in an integrated analysis (block 190). The analyses may include Stoneley reflection coefficient and transmission coefficient, combined receiver-transmitter dipole NDE curve from dipole waveform, caliper logs, log-depth plot, and petrophysical logs. The resulting product of the workflow of FIG. 8 may provide robust fracture indicator (block 192). Indeed, it may include a combined and more robust fracture indicator, even in the absence of a borehole image for the drilled wellbore 18 which could be vertical, deviated or horizontal.

In the disclosure above, although the waveforms generated by the acoustic receivers are described as being processed in a digital format, they could be processed in analog form. In addition, the processing of the waveform signals in accordance with the disclosure may be done either while the acoustic tool is being moved and operated in the borehole or at a subsequent time. The references to processing of waveforms as used here are thus intended to include both real time and delayed processing of the signals generated while logging a borehole.

The specific embodiments described above have been shown by way of example, and it should be understood that these embodiments may be susceptible to various modifications and alternative forms. It should be further understood that the claims are not intended to be limited to the particular forms disclosed, but rather to cover modifications, equivalents, and alternatives falling within the spirit and scope of this disclosure.

The invention claimed is:

1. A method comprising: placing an acoustic downhole tool into a borehole in a geological formation;
   emitting a dipole acoustic signal using one or more acoustic transmitters of the downhole tool;
   measuring the dipole acoustic signal using one or more acoustic receivers of the downhole tool;
   computing, using a processor, a dipole differential energy of the dipole acoustic signal as measured by two of the one or more acoustic receivers or as emitted by two of the one or more acoustic transmitters, or both; and
   providing, using the processor, an indication of the dipole differential energy to facilitate identification of characteristics of the geological formation or the borehole, or both
   wherein the dipole differential energy is computed as a normalized differential energy, and
   wherein computing the dipole differential energy comprises removing a baseline energy level from the normalized differential energy.

2. The method of claim 1, wherein computing the dipole differential energy comprises:
receiving a first measured energy curve of the dipole acoustic signal as measured by a first receiver of the one or more acoustic receivers;
receiving a second measured energy curve of the dipole acoustic signal as measured by a second receiver of the one or more acoustic receivers;
computing a first sum of energy from the first measured energy curve over a first time window;
computing a second sum of energy from the second measured energy curve over a second time window; and
computing a difference between the first sum of energy and the second sum of energy, the whole of which is divided by a spatial distance between the first receiver and the second receiver, to determine a normalized differential energy.

3. The method of claim 2, wherein the second time window is equal in duration to the first time window but offset from the first time window by amount of time for propagation of arrivals between the first receiver and the second receiver.

4. The method of claim 1, wherein computing the dipole differential energy comprises:
receiving a first measured energy curve of the dipole acoustic signal as emitted by a first transmitter of the one or more acoustic transmitters and measured by a first receiver of the one or more acoustic receivers;
receiving a second measured energy curve of the dipole acoustic signal as emitted by a second transmitter of the one or more acoustic transmitters and measured by the first receiver of the one or more acoustic receivers;
computing a first sum of energy from the first measured energy curve over a first time window; computing a second sum of energy from the second measured energy curve over a second time window; and
computing a difference between the first sum of energy and the second sum of energy, the whole of which is divided by a spatial distance between the first transmitter and the second transmitter, to determine a normalized differential energy.

5. The method of claim 1, wherein the indication of the dipole differential energy comprises an indicator that is higher when a fracture is more likely and lower when a fracture is less likely.

6. The method of claim 1, wherein providing the indication of the dipole differential energy comprises generating a well log that includes a track indicative of the dipole differential energy.

7. The method of claim 1, wherein providing the indication of the dipole differential energy comprises flagging depths where the dipole differential energy is suggestive of a fracture in the geological formation.

8. The method of claim 1, comprising indicating when the normalized differential energy exceeds an energy threshold as indicative of a fracture in the geological formation.

9. The method of claim 8, wherein removing the baseline energy level from the normalized differential energy comprises removing a moving average from a curve of normalized differential energy values over depth.

10. The method of claim 8, wherein removing the baseline energy level from the normalized differential energy comprises removing a value of normalized differential energy from a first depth interval of a curve of normalized differential energy values over depth, wherein the first depth interval represents a zone where the curve of normalized differential energy values does not fluctuate beyond a fluctuation threshold.

11. The method of claim 1, wherein the acoustic downhole tool is placed into the wellbore via logging-while-drilling, wireline, coiled tubing, or through-the-bit conveyance.

12. A downhole well logging system comprising:
one or more acoustic transmitters configured to emit a dipole acoustic signal in a borehole drilled into a geological formation;
one or more acoustic receivers configured to measure the dipole acoustic signal; and
a processor configured to:
determine a dipole differential energy of the dipole acoustic signal as measured by two of the one or more acoustic receivers or as emitted by two of the one or more acoustic transmitters, or both, in a first azimuthal direction; and
provide an indication of the dipole differential energy in the first azimuthal direction to facilitate identification of characteristics of the geological formation or the borehole, or both;
wherein the dipole differential energy is determined as a normalized differential energy, and
wherein determining the dipole differential energy comprises removing a baseline energy level from the normalized differential energy.

13. The well logging system of claim 12, wherein one acoustic transmitter of the one or more acoustic transmitters is configured to emit the dipole acoustic signal and an array of acoustic receivers of the one or more acoustic receivers is configured to measure the dipole acoustic signal.

14. The well logging system of claim 12, wherein an array of at least two acoustic transmitters is configured to emit the dipole acoustic signal and one acoustic receiver of the one or more acoustic receivers is configured to measure the acoustic dipole signal.

15. The well logging system of claim 12, wherein the two of the one or more acoustic receivers by which the dipole differential energy is computed are configured to measure the acoustic dipole signal along the first azimuthal direction, or wherein the two of the one or more acoustic transmitters by which the dipole differential energy is computed are configured to emit the acoustic dipole signal along the first azimuthal direction, or both.

16. One or more tangible, non-transitory, machine-readable media comprising instructions to:
receive dipole energy curves over depth for each receiver and each transmitter obtained by an acoustic downhole tool placed in a borehole in a geological formation;
compute normalized differential energy curves for a plurality of receiver pairs or transmitter pairs, or both, using at least some of the dipole energy curves; and
obtain a stacked receiver normalized differential energy curve by combining a plurality of normalized differential energy curves for at least some of the plurality of receiver pairs, or obtain a stacked transmitter normalized differential energy curve by combining a plurality of normalized differential energy curves for at least some of the plurality of transmitter pairs, or obtain both the stacked receiver normalized differential energy curve and the stacked transmitter normalized differential energy curve;
wherein the stacked receiver normalized differential energy curve or the stacked transmitter normalized differential energy curve, or both, are configured to facilitate identification of characteristics of the geological formation or the borehole, or both, and wherein computing the normalized differential energy curves comprises removing a baseline energy curve from the normalized differential energy.

17. The machine-readable media of claim 16, comprising instructions to compute a combined transmitter-receiver normalized differential energy curve by taking an arithmetic average of the stacked receiver normalized differential energy curve and the stacked transmitter normalized differential energy curve.

18. The machine-readable media of claim 17, comprising instructions to remove the baseline energy level from the combined transmitter-receiver normalized differential energy curve to generate a fracture indicator that suggests a presence of a fracture when the fracture indicator exceeds a threshold.

19. The machine-readable media of claim 16, comprising instructions to use the stacked receiver normalized differential energy curve or the stacked transmitter normalized differential energy curve, or both, to generate a well log comprising a dipole well log track configured to be used in complement with a monopole Stoneley waveform analysis well log track to facilitate identification of a fracture.

* * * * *